United States Patent
Kim et al.

(10) Patent No.: US 8,822,079 B2
(45) Date of Patent: Sep. 2, 2014

(54) COMPOSITE ANODE ACTIVE MATERIAL FOR LITHIUM RECHARGEABLE BATTERY, METHOD OF PREPARING THE SAME AND LITHIUM RECHARGEABLE BATTERY USING THE MATERIAL

(75) Inventors: Gue-sung Kim, Yongin-si (KR); Han-su Kim, Seoul (KR); Dong-min Im, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 987 days.

(21) Appl. No.: 12/434,179

(22) Filed: May 1, 2009

(65) Prior Publication Data

US 2010/0119946 A1   May 13, 2010

(30) Foreign Application Priority Data

Nov. 10, 2008   (KR) .................. 10-2008-0111224

(51) Int. Cl.
*H01M 4/58* (2010.01)
*H01M 4/52* (2010.01)
*B23Q 11/00* (2006.01)

(52) U.S. Cl.
USPC ............. 429/231.95; 429/231.8; 429/221; 429/231.5; 409/131

(58) Field of Classification Search
CPC . H01M 4/587; H01M 10/0525; Y02E 60/122
USPC ........ 429/231.95, 231.8, 221, 231.5; 409/131
See application file for complete search history.

(56) References Cited

U.S. PATENT DOCUMENTS

| | | | |
|---|---|---|---|
| 2003/0180619 A1* | 9/2003 | Tamura et al. ........... | 429/231.95 |
| 2006/0121348 A1* | 6/2006 | Mizutani et al. .......... | 429/218.1 |
| 2007/0072077 A1* | 3/2007 | Kusumoto et al. ......... | 429/218.1 |

OTHER PUBLICATIONS

Mao et al.' "Active/Inactive Nanocomposites as Anodes for Li-Ion Batteries", 1999 (no month, available electronically Oct. 1998), Electrochemical and Solid State Letters, 2 (1), pp. 3-5.*

* cited by examiner

*Primary Examiner* — Jessee Roe
(74) *Attorney, Agent, or Firm* — Lee & Morse, P.C.

(57) ABSTRACT

A composite anode active material includes a first intermetallic compound, a second intermetallic compound, a metal that is incapable of alloy formation with lithium, and carbon. In the composite anode active material, an amorphous carbon is present between the first intermetallic compound and the second intermetallic compound, and the metal that is incapable of alloy formation with lithium is uniformly distributed throughout in the composite anode active material. The composite anode active material may be used as an anode of a lithium rechargeable battery.

11 Claims, 4 Drawing Sheets

COMPOSITE ANODE ACTIVE MATERIAL FOR LITHIUM RECHARGEABLE BATTERY, METHOD OF PREPARING THE SAME AND LITHIUM RECHARGEABLE BATTERY USING THE MATERIAL

CROSS-REFERENCE TO RELATED APPLICATIONS

This application claims the benefit of Korean Patent Application No. 2008-111224, filed on Nov. 10, 2008, in the Korean Intellectual Property Office, the disclosure of which is incorporated herein by reference.

BACKGROUND

1. Field

One or more embodiments relate to a composite anode active material for a lithium rechargeable battery, a method of preparing the same, and a lithium rechargeable battery using the material.

2. Description of the Related Art

As an anode active material for lithium ion batteries, graphite, which is a form of crystalline carbon, is generally used because of its excellent capacity retaining characteristics and potential characteristics. However, graphite has a very low theoretical capacity density, i.e., 372 mAh/g. Thus, much research into a replacement of graphite having a low theoretical capacity density for other anode active materials has been conducted. Examples of other anode active materials include materials capable of alloy formation with lithium, such as, Si, Sn, or Al. However, materials that are capable of alloy formation with lithium, such as Si or Sn, may cause a volumetric expansion during the formation of a lithium alloy, thereby creating an electrically disconnected active material in an electrode and aggravating electrolytic decomposition due to an increase in surface area.

SUMMARY

One or more embodiments include a composite anode active material of a lithium rechargeable battery, which has improved capacity retention and cycle efficiency.

One or more embodiments include an anode containing the composite anode active material.

One or more embodiments include a lithium rechargeable battery including the anode.

One or more embodiments include a method of preparing the composite anode active material.

Additional aspects will be set forth in part in the description which follows and, in part, will be apparent from the description, or may be learned by practice of aspects of the invention.

To achieve the above and/or other aspects, one or more embodiments may include a composite anode active material for a lithium rechargeable battery, including a first intermetallic compound; a second intermetallic compound; a metal that is incapable of alloy formation with lithium; and carbon, wherein the first intermetallic compound and the second intermetallic compound exist in different phases.

To achieve the above and/or other aspects, one or more embodiments may include an anode comprising the composite anode active material.

To achieve the above and/or other aspects, one or more embodiments may include a lithium rechargeable battery comprising the anode.

To achieve the above and/or other aspects, one or more embodiments may include a method of preparing a composite anode active material for a lithium rechargeable battery, the method including mixing Sn, Fe, Mo and C powders to form a mixed powder; and milling the mixed powder.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
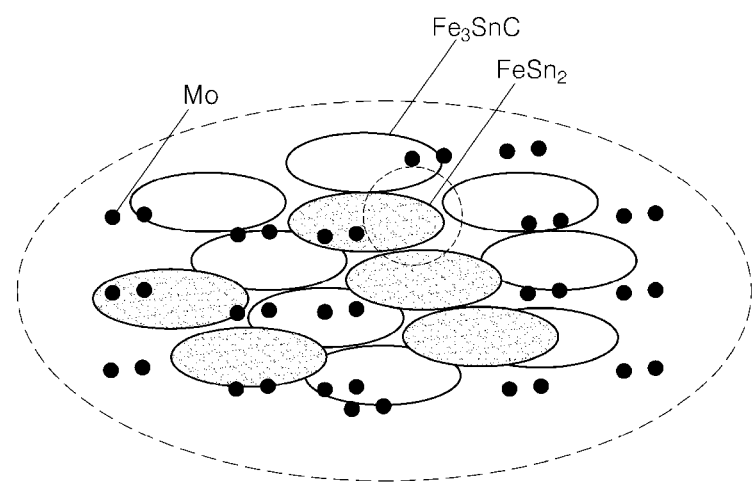
FIG. 1 is a schematic diagram of composite anode active material particles according to an embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

To address problems that may arise in a conventional anode active material for a lithium ion battery, an amorphous Sn-based oxide has been proposed. The amorphous Sn-based oxide exhibits excellent capacity retention properties by minimizing the particle size of Sn and preventing agglomeration of Sn generated during charging and discharging. However, when an amorphous SN-based oxide is used, a lithium oxide may generated due to an inevitable reaction between lithium and oxygen atoms generated in the amorphous Sn-based oxide, and accordingly, irreversible capacity is increased. In addition, as an alternative, an intermetallic compound between Sn and Si, and between Cu or Fe and Mg is disclosed in the related art. The intermetallic compound minimizes the particle size of Sn and Si, and does not induce a reaction of forming $Li_2O$ due to an absence of oxygen, thereby having high initial efficiency. However, the intermetallic compound tends to undergo agglomeration because as the cycle number is increased, the particle sizes of Sn and Si are increased compared to the particle sizes at an initial stage, and thus, capacity retention characteristics of the intermetallic compound gradually degrade.

To address these problems occurring in crystalline carbon or metals capable of alloy formation with lithium, which have been used as an anode active material for a lithium rechargeable battery, the present inventors found that a composite anode active material including Sn, Fe, Mo and C (carbon) has excellent capacity retention and cycle efficiency properties.

Accordingly, a composite anode active material for a lithium rechargeable battery according to an embodiment includes a first intermetallic compound; a second intermetallic compound; a metal that is incapable of alloy formation with lithium; and carbon. The first intermetallic compound and the second intermetallic compound exist in different phases. As used herein the term "intermetallic compound" refers generally to an alloy.

The first intermetallic compound and the second intermetallic compound have crystallinity, and each independently includes at least two selected from the group consisting of Sn, FeQ and C. For example, the first and second intermetallic compounds have crystallinity and may each independently be an intermetallic compound comprising Sn and Fe; Sn and C; Fe and C; or Sn, Fe and C.

Specifically, the first intermetallic compound and the second intermetallic compound may each independently be an intermetallic compound comprising Sn and Fe or Sn, Fe and C. A ratio of Sn and Fe or Sn, Fe and C, which constitute a crystal, may vary, but the intermetallic compound may be in the form of a crystal, such as $Fe_3SnC$ or $FeSn_2$.

The metal that is incapable of alloy formation with lithium is uniformly distributed throughout the composite anode active material. The metal that is incapable of alloy formation with lithium may be Mo or a metal that is capable of alloy formation with Mo. When Mo is uniformly distributed entirely in the composite anode active material for a lithium rechargeable battery, Mo promotes the formation of the intermetallic compound comprising Sn, Fe and C, which is crystalline.

The first intermetallic compound and the second intermetallic compound each may be independently crystalline $Fe_3SnC$ or $FeSn_2$, the metal that is incapable of alloy formation with lithium may be Mo, and an amorphous carbon may exist between the first intermetallic compound and the second intermetallic compound.

FIG. 1 is a schematic diagram of composite anode active material particles according to an embodiment.

Referring to FIG. 1, Sn, Fe and C are present in the form of crystalline portions of $Fe_3SnC$ and $FeSn_2$. The metal that is incapable of alloy formation with lithium is Mo, which is uniformly distributed throughout the composite anode active material.

Figure 4:
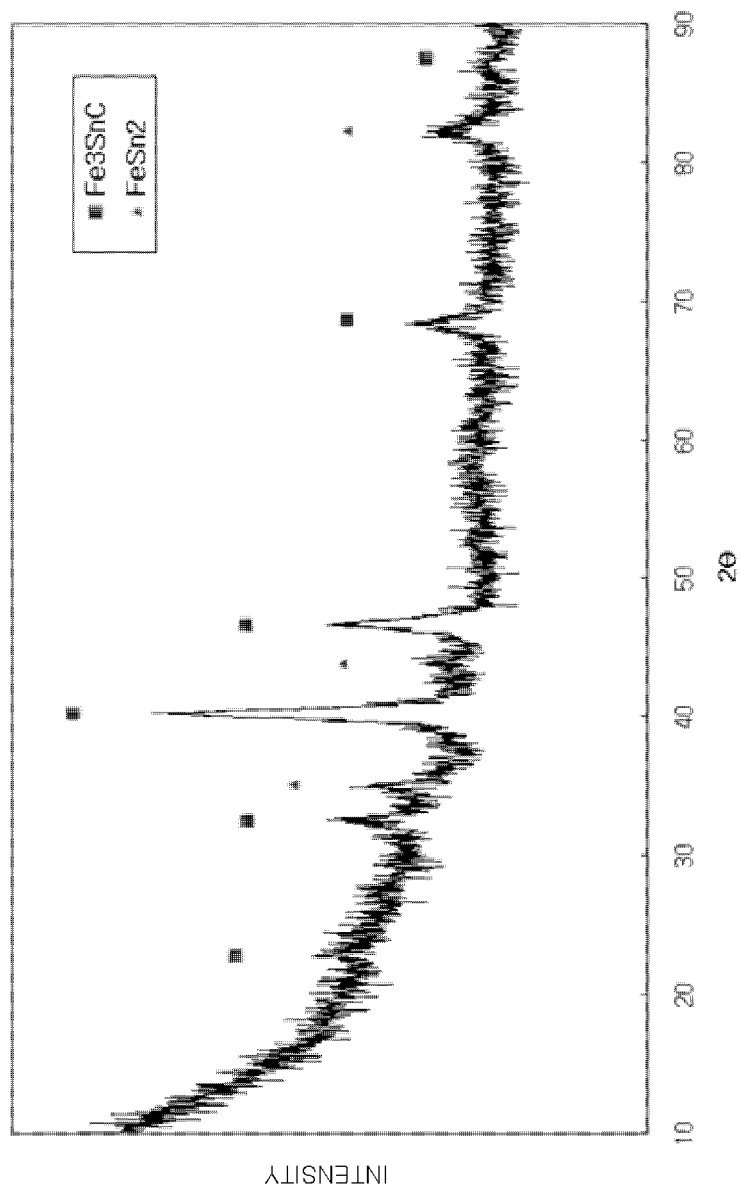
FIG. 4 is a graph showing X-ray diffraction (XRD) data of the composite anode active material prepared in Example 1.

FIG. 4 is a graph showing x-ray diffraction (XRD) data of a composite anode active material according to the embodiment prepared in Example 1, discussed below. In FIG. 4, it can be seen that peaks corresponding to crystalline $Fe_3SnC$ and crystalline $FeSn_2$ are present. Accordingly, it can be seen that $Fe_3SnC$ and $FeSn_2$ as the first intermetallic compound comprising Sn, Fe and C and the second intermetallic compound comprising Fe and Sn are present.

Figure 2:
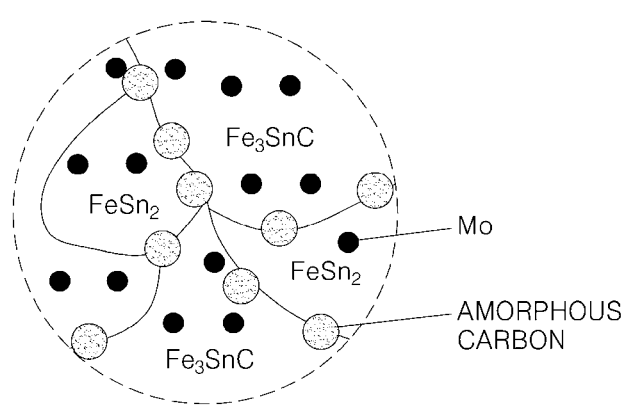
FIG. 2 is an schematic enlarged diagram of the area represented by the dotted line illustrated in FIG. 1.

FIG. 2 is an enlarged schematic diagram of a randomly selected region of the composite anode active material of FIG. 1, such as a region within the dotted line illustrated in FIG. 1.

A part of the carbon in the composite anode active material is present in $Fe_3SnC$, which is a crystalline intermetallic compound including Fe, Sn and C. However, due to binding properties of carbon, agglomeration of carbon atoms occurs at interfaces of the crystalline intermetallic compound $Fe_3SnC$ and the crystalline intermetallic compound $FeSn_2$, as illustrated in FIG. 2, such that amorphous carbon is present between the first intermetallic compound, $Fe_3SnC$, and the second intermetallic compound, $FeSn_2$. Thus, agglomeration of the first and second intermetallic compounds, which may occur during charging and discharging, is prevented, and as a result, the capacity retention properties of the composite anode active material are excellent. In addition, the carbon covers the first and second intermetallic compounds, and thus the high rate capability of the composite anode active material is increased.

Although peaks of Mo are not shown in the XRD plot of FIG. 4, Mo can be detected in proportion to the amount of Mo added by inductively coupled plasma (ICP) analysis. ICP results of the composite active anode material of Example 1 showed that Mo was uniformly distributed throughout the composite anode active material, as illustrated in FIG. 1.

In the composite anode active material comprising Sn, Fe, Mo and C, in order for Sn, Fe and C to form crystals in the form of $Fe_3SnC$ or $FeSn_2$, various conditions may be provided. Specifically, in terms of amounts, the composite anode active material may comprise about 10 to about 100 parts by weight of Fe, about 0.1 to about 20 parts by weight of Mo, and about 10 to about 50 parts by weight of C, based on 100 parts by weight of Sn. Other conditions will be described later in the Examples.

When the amounts of Sn, Fe, Mo and C are within the ranges described above, the composite anode active material has excellent capacity retention and cycle efficiency properties, and thus may be used in an anode of a lithium rechargeable battery.

An anode according to an embodiment includes the composite anode active material. As a non-limiting example, the anode may be prepared by forming an anode active material composition including the composite anode active material and a binder in a defined shape or by applying the anode active material composition onto a current collector such as copper foil.

In particular, the anode active material composition may be prepared and then directly coated onto a copper foil current collector to obtain an anode plate. Alternatively, the anode active material composition may be prepared and then cast onto a separate support, and then, a composite anode active material film stripped from the support may be laminated onto the copper foil current collector to obtain an anode plate. The anode is not limited to the illustrated examples and many other modifications may be included in the scope of the invention.

In higher capacity batteries, a large amount of current is charged and discharged in the higher capacity batteries, and thus, it is desirable to use a low electrical resistance material as an electrode material. Thus, in order to reduce the resistance of the electrode, a variety of conductive materials may be added. For example, carbon black or graphite fine particles may be used as the conductive material. Alternatively, the composite anode active material may be printed on a flexible electrode substrate in preparing a printable battery.

A lithium battery according to an embodiment may be prepared in the following manner.

First, a cathode active material, a conductive agent, a binder, and a solvent are mixed to prepare a cathode active material composition. The cathode active material composition may be directly coated onto a metallic current collector and dried to prepare a cathode plate. Alternatively, the cathode active material composition may be cast onto a separate support and detached from the support to obtain a cathode active material film. Then, the cathode active material film may be laminated onto the metallic current collector to prepare a cathode plate.

A lithium-containing metal oxide that is commonly used in the art may be used as the cathode active material. Examples of the lithium-containing metal oxide include $LiCoO_2$, $LiMn_xO_{2x}$ (x=1, 2), $LiNi_{1-x}Mn_xO_2$ (0<x<1), or $LiNi_{1-x-y}Co_xMn_yO_2$ (0≤x≤0.5, 0≤y≤0.5). Specific examples of the lithium-containing metal oxide are compounds capable of intercalation and deintercalation of lithium ions, such as $LiMn_2O_4$, $LiCoO_2$, $LiNiO_2$, $LiFeO_2$, $V_2O_5$, TiS, MoS, or t like. Carbon black or graphite fine particles are used as the conductive agent. Examples of the binder include a vinylidene fluoride/hexafluoropropylene copolymer, polyvinylidenefluoride (PVDF), polyacrylonitrile, polymethylmethacrylate, polytetrafluoroethylene, mixtures of these materials, and a styrene butadiene rubber polymer. As the solvent, N-methyl-pyrrolidone, acetone, water, or the like, may be used. The amounts of the cathode electrode active material, the conductive agent, the binder, and the solvent used in the manufacture of the lithium battery may be amounts generally acceptable in the art.

Any separator that is commonly used for lithium batteries can be used. In particular, the separator that is used may have low resistance to the migration of ions in an electrolyte and may have an excellent electrolyte-retaining ability. Examples of the separator include glass fiber, polyester, TEFLON, polyethylene, polypropylene, polytetrafluoroethylene (PTFE), combinations thereof. The material that forms the separator may be in non-woven or woven fabric form. In particular, a windable separator including polyethylene, polypropylene or the like can be used for a lithium ion battery. A separator that can retain a large amount of an organic electrolytic solution may be used for a lithium-ion polymer battery. A method of forming a typical separator will now be described.

A polymer resin, a filler and a solvent are mixed to prepare a separator composition. The separator composition is then directly coated onto an electrode, and then dried to form a separator film. Alternatively, the separator composition may be cast onto a separate support, dried, detached from the separate support, and finally laminated on an upper portion of the electrode, thereby forming a separator film.

Any polymer resin that is commonly used for binding electrode plates can be used to form the separator. Examples of the polymer resin include vinylidenefluoride/hexafluoropropylene copolymer, polyvinylidene fluoride, polyacrylonitrile, polymethylmethacrylate and mixtures thereof.

In the electrolyte solution, the solvent can be a solvent selected from the group consisting of propylene carbonate, ethylene carbonate, fluoroethylene carbonate, diethyl carbonate, methyl ethyl carbonate, methyl propyl carbonate, butylene carbonate, benzonitrile, acetonitrile, tetrahydrofuran, 2-methyltetrahydrofuran, γ-butyrolactone, dioxolane, 4-methyldioxorane, N,N-dimethylformamide, dimethyl acetamide, dimethylsulfoxide, dioxane, 1,2-dimethoxyethane, sulfolane, dichloroethane, chlorobenzene, nitrobenzene, dimethyl carbonate, methyl isopropyl carbonate, ethyl propyl carbonate, dipropyl carbonate, dibutyl carbonate, diethylene glycol, dimethyl ether, and mixtures thereof. The electrolyte used may be a lithium salt in an electrolyte solvent, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_xF_{2x+1}SO_2)(C_yF_{2y+1}SO_2)$ (where x and y are each independently a natural number), LiCl, LiI, or mixtures of at least two of the electrolytes.

The separator is interposed between the cathode plate and the anode plate to form an electrode assembly. The electrode assembly may be wound or folded and then sealed in a cylindrical or rectangular battery case. Then, an organic electrolyte solution is injected into the battery case to complete preparation of a lithium ion battery. A plurality of electrode assemblies may be stacked in a bi-cell structure and impregnated with an organic electrolyte solution. The resultant may be put into a pouch and hermetically sealed, thereby completing a lithium ion polymer battery.

Also, a plurality of electrode assemblies may be stacked to form a battery pack, and the battery pack may be used as an electric vehicle battery, which typically operates at a high temperature with high power generation.

A method of preparing the composite anode active material, according to an embodiment, includes mixing Sn, Fe, Mo and C powders and milling the mixed powder.

Figure 3:
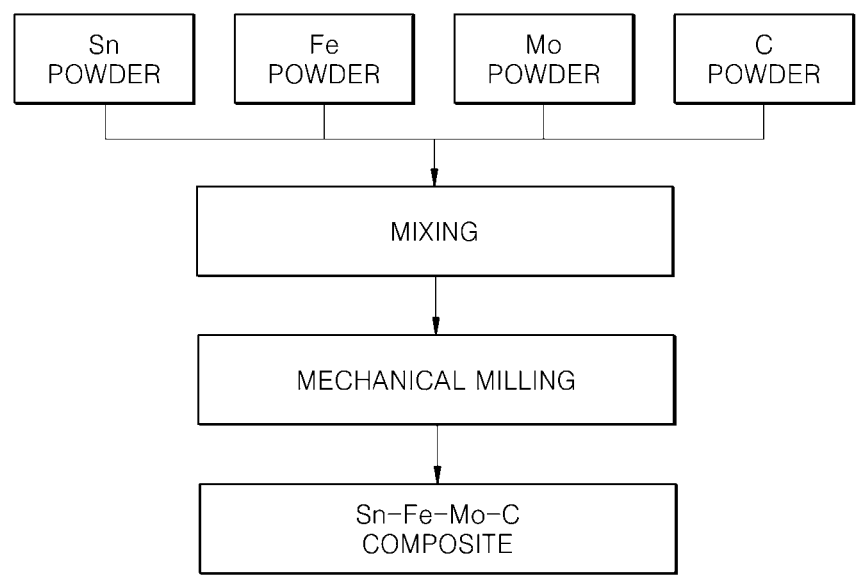
FIG. 3 is a flowchart illustrating a method of preparing a composite anode active material, according to an embodiment.

FIG. 3 is a flowchart illustrating a method of preparing the composite anode active material, according to an embodiment. Referring to FIG. 3, Sn, Fe, Mo and C powders are respectively weighed and mixed together, and then the mixed powder is mechanically milled to prepare a composite anode active material for a lithium rechargeable battery.

In the preparing process, the composite anode active material may comprise about 10 to about 100 parts by weight of Fe, about 0.1 to about 20 parts by weight of Mo, and about 10 to about 50 parts by weight of C, based on 100 parts by weight of Sn.

The milling process may be performed at 300 to 700 rpm for 30 to 70 hours.

The composite anode active material prepared within the amount ranges of Sn, Fe, Mo and C and the ranges of rpm and time has excellent capacity retention and cycle efficiency properties, and thus can used in an anode of a lithium rechargeable battery.

One or more embodiments will now be described in more detail with reference to the following examples. However, these examples are for illustrative purposes only and are not intended to limit the scope of the one or more embodiments.

Preparation of composite anode active material

Example 1

10 g of Sn, 6.8 g of Fe, 1 g of Mo, and 2.2 g of carbon were put into a stainless steel container with metal balls, and the mixture was milled at about 500 rpm for about 50 hours to prepare a composite anode active material for a lithium rechargeable battery. The total amount of the metal balls was 20 times greater than a total amount of Sn, Fe, Mo and carbon The mill used was Planetary Mono Mill (FRITSCH GmbH, Germany).

FIG. 4 is a graph showing X-ray diffraction (XRD) data of a composite anode active material prepared in Example 1. The peaks shown in FIG. 4 indicate that the composite anode active material of Example 1 comprised $Fe_3SnC$ and $FeSn_2$. In addition, amorphous carbons was present in the composite anode active material, but the peaks of the carbons are not shown in the XRD analysis.

Example 2

A composite anode active material for a lithium rechargeable battery was prepared in the same manner as in Example 1, except that 7.6 g of Fe and 0.6 g of Mo were used.

Example 3

A composite anode active material for a lithium rechargeable battery was prepared in the same manner as in Example 1, except that 7.6 g of Fe and 0.2 g of Mo was used.

Comparative Example 1

A composite anode active material for a lithium rechargeable battery was prepared in the same manner as in Example 1, except that 7.8 g of Fe was used and Mo was not used.

Figure 5:
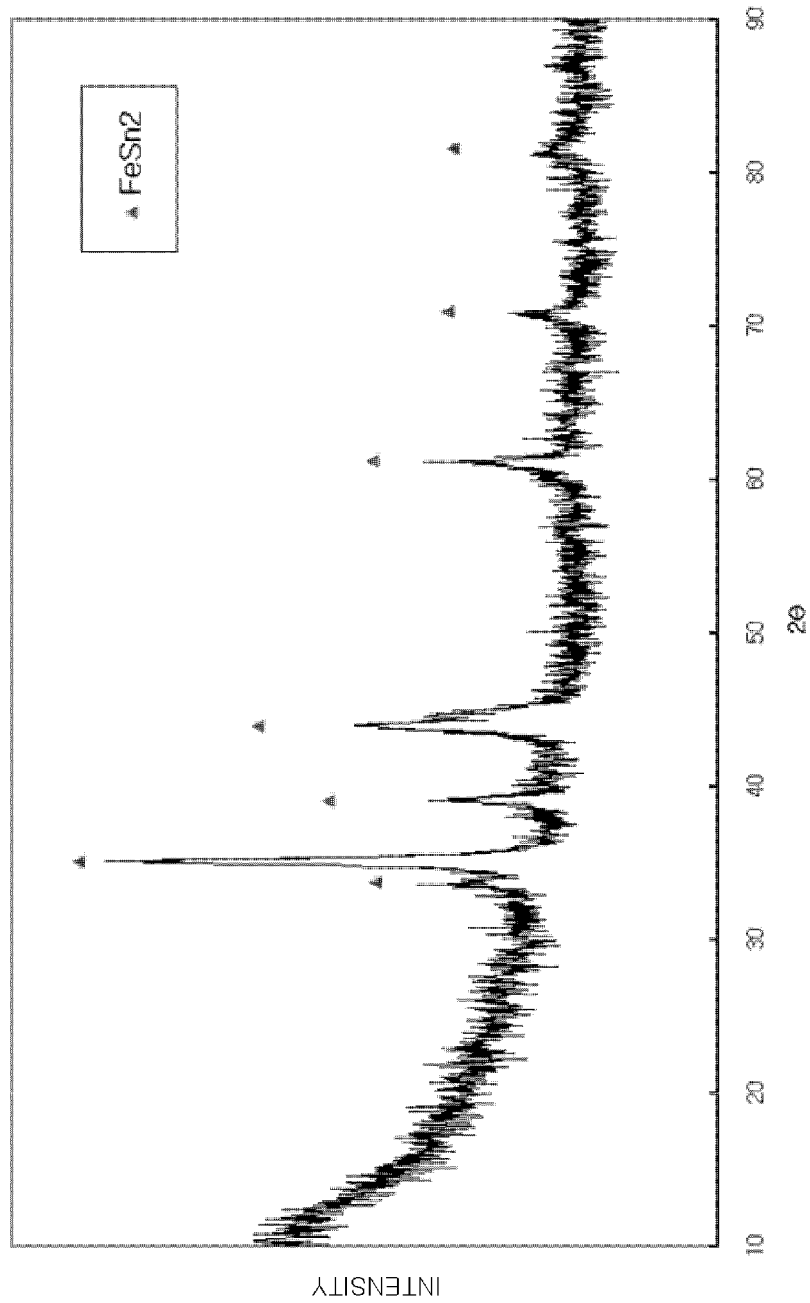
FIG. 5 is a graph showing XRD data of the composite anode active material prepared in Comparative Example 1.

FIG. 5 is a graph showing XRD data of a composite anode active material prepared in Comparative Example 1.

The peaks shown in FIG. 5 indicate that the composite anode active material of Comparative Example 1 comprised only FeSn$_2$ and did not comprise Fe$_3$SnC, unlike the composite anode active material of Example 1. Without being bound to any particular theory, it is believed that because Mo, which helps to form Fe$_3$SnC, was not used, only FeSn$_2$ was formed.

ICP Measurement

ICP (inductively coupled plasma) measurement was performed on the composite anode active materials prepared in Examples 1 and 2 and Comparative Example 1 to convert ppm units to wt %. The results are shown in Table 1 below.

TABLE 1

|  | Fe (wt %) | Mo (wt %) | Sn (wt %) |
|---|---|---|---|
| Example 1 | 31.82 | 4.72 | 48.44 |
| Example 2 | 34.06 | 2.93 | 47.94 |
| Example 3 | 34.04 | 0.98 | 49.53 |
| Comparative Example 1 | 36.95 | 0 | 49.71 |

Referring to Table 1, it can be seen that the composite anode active materials of Examples 1 through 3 comprised Mo, which was not detected in the XRD analysis. In addition, it can be seen that the ratio between the amounts of Sn, Fe and Mo in Table 1 was almost the same as the ratio of the initial amounts of Sn, Fe and Mo that were added in Examples 1 through 3 and Comparative Example 1.

Preparation of Lithium Rechargeable Battery

Example 4

The composite anode active material prepared in Example 1, graphite powder, 10 wt % of AY0724 (a water-dispersed polyacrylate) as a binder, and 1 wt % of a sodium-carboxymethylcellulose (Na-CMC) solution were mixed in a weight ratio of 65:32:1.5:1.5 to prepare a slurry. The slurry was coated onto a Cu foil using a doctor blade to a thickness of about 60 μm. Subsequently, the Cu foil coated with the slurry was dried in vacuum at 120° C. for 2 hours and rolled to prepare an anode. A test cell was prepared using the anode and a counter electrode made of a lithium metal, and a charge-discharge evaluation was performed on the test cell. The test cell used was a CR2016-standard coin cell, a polypropylene film (Cellgard 3510) was used as a separator, and 1.3 M LiPF$_6$ melted in a mixture of ethylene carbonate (EC), diethyl carbonate (DEC) and fluoroethylene carbonate (FEC) (weight ratio of 2:6:2) was used as an electrolytic solution. The charge-discharge evaluation was performed such that the coin cell was charged until the voltage of the cell reached 0.001 V against a Li electrode, and then the charged cell was discharged until the voltage of the cell reached 1.5 V against the Li electrode. The charge-discharge test was repeated for 50 cycles. In the charge-discharge evaluation, the charging and discharging processes were performed at a current of 50 mA per 1 g of the anode.

Example 5

A lithium rechargeable battery was prepared in the same manner as in Example 4, except that the composite anode active material prepared in Example 2 was used.

Example 6

A lithium rechargeable battery was prepared in the same manner as in Example 4, except that the composite anode active material prepared in Example 3 was used.

Comparative Example 2

A lithium rechargeable battery was prepared in the same manner as in Example 4, except that the composite anode active material prepared in Comparative Example 1 was used.

The charge-discharge evaluation was performed on the lithium rechargeable batteries prepared in Examples 4 through 6 and Comparative Example 2, and the results are shown in Table 2 below.

TABLE 2

|  | Capacity retention after 50$^{th}$ charge and discharge with respect to initial capacity | Cycle efficiency after 50$^{th}$ charge and discharge |
|---|---|---|
| Example 4 | 88% | 99.56 |
| Example 5 | 89% | 99.52 |
| Example 6 | 86% | 99.62 |
| Comparative Example 2 | 60% | 97.38 |

Referring to Table 2, the lithium rechargeable batteries of Examples 4 through 6 were shown to have excellent capacity retention and cycle efficiency characteristics, compared with the lithium rechargeable battery of Comparative Example 2.

As described above, according to the one or more of the above embodiments, a lithium rechargeable battery using a composite anode active material has excellent capacity retention and cycle efficiency characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composite anode active material of a lithium rechargeable battery, comprising:
   a first intermetallic compound;
   a second intermetallic compound;
   molybdenum; and
   carbon;
   wherein the first intermetallic compound and the second intermetallic compound exist in different phases,
   wherein the first intermetallic compound and the second intermetallic compound are crystalline, and wherein the first intermetallic compound includes Sn and Fe, and the second intermetallic compound includes Sn, Fe, and C, and
   wherein the composite anode active material includes 10 to 90 parts by weight of Fe, about 0.1 to about 20 parts by weight of Mo, and about 10 to about 50 parts by weight of C, based on 100 parts by weight of Sn.

2. The composite anode active material of claim 1, wherein the molybdenum is uniformly distributed throughout the composite anode active material.

3. The composite anode active material of claim 1, wherein the first intermetallic compound is crystalline FeSn$_2$ and the second intermetallic compound is crystalline Fe$_{3.5}$nC.

4. The composite anode active material of claim 1, wherein the first intermetallic compound is crystalline FeSn$_2$ and the second intermetallic compound is crystalline Fe$_3$SnC, and wherein an amorphous carbon is present between the first intermetallic compound and the second intermetallic compound.

5. An anode comprising the composite anode active material according to claim 1.

6. A lithium rechargeable battery comprising the anode according to claim 5.

7. The anode of claim 5, wherein the molybdenum is uniformly distributed throughout the composite anode active material.

8. The anode of claim 5, wherein the first intermetallic compound is crystalline $FeSn_2$ and the second intermetallic compound is crystalline $Fe_3SnC$.

9. The anode of claim 5, wherein the first intermetallic compound is crystalline $FeSn_2$ and the second intermetallic compound is crystalline $Fe_3SnC$, and wherein an amorphous carbon is present between the first intermetallic compound and the second intermetallic compound.

10. A method of preparing a composite anode active material for a lithium rechargeable battery, the method comprising:

mixing Sn, Fe, Mo and C powders to form a mixed powder; and milling the mixed powder;

wherein milling the mixed powder produces a first intermetallic compound and a second intermetallic compound, such that the first intermetallic compound and the second intermetallic compound exist in different phases, wherein the first intermetallic compound and the second intermetallic compound are crystalline, and wherein the first intermetallic compound includes Sn and Fe, and the second intermetallic compound includes Sn, Fe, and C, and wherein the composite anode active material includes 10 to 90 parts by weight of Fe, about 0.1 to about 20 parts by weight of Mo, and about 10 to about 50 parts by weight of C, based on 100 parts by weight of Sn.

11. The method of claim 10, wherein the milling is performed at 300 to 700 rpm for 30 to 70 hours.

* * * * *